United States Patent [19]
Kim

[11] Patent Number: 5,627,123
[45] Date of Patent: *May 6, 1997

[54] SOX CONTROL COMPOSITIONS

[75] Inventor: Gwan Kim, Olney, Md.

[73] Assignee: W. R. Grace & Co.-Conn., New York, N.Y.

[*] Notice: The term of this patent shall not extend beyond the expiration date of Pat. No. 5,288,675.

[21] Appl. No.: 368,923

[22] Filed: Jan. 5, 1995

Related U.S. Application Data

[60] Continuation of Ser. No. 182,468, Jan. 18, 1994, Pat. No. 5,399,327, which is a division of Ser. No. 831,610, Feb. 5, 1992, Pat. No. 5,288,675.

[51] Int. Cl.$^6$ .................................................. B01J 23/10
[52] U.S. Cl. ............................................ 502/303; 507/341
[58] Field of Search ......................... 502/303, 65, 341; 423/244.01, 244.11; 902/340

[56] References Cited

U.S. PATENT DOCUMENTS

| | | | |
|---|---|---|---|
| 4,215,998 | 8/1980 | Futami | 502/303 |
| 4,369,130 | 1/1983 | Bertolacini et al. | 423/244.11 |
| 4,423,019 | 12/1983 | Bertolacini et al. | 423/244 |
| 4,428,827 | 1/1984 | Hobbs et al. | 208/120 |
| 4,469,589 | 9/1984 | Yoo et al. | 208/120 |
| 4,471,070 | 9/1984 | Siefert et al. | 502/302 |
| 4,472,267 | 9/1984 | Yoo et al. | 208/120 |
| 4,495,304 | 1/1985 | Yoo et al. | 502/66 |
| 4,495,305 | 1/1985 | Yoo et al. | 502/65 |
| 4,497,902 | 2/1985 | Bertolacini et al. | 502/65 |
| 4,589,978 | 5/1986 | Green et al. | 423/244.11 |
| 4,609,539 | 9/1986 | Horecky et al. | 423/244 |
| 4,622,210 | 11/1986 | Hirshberg et al. | 422/144 |
| 4,728,635 | 3/1988 | Bhattacharyya et al. | 502/304 |
| 4,735,705 | 4/1988 | Burk, Jr. et al. | 208/113 |
| 4,755,498 | 7/1988 | Setzer et al. | 502/303 |
| 4,758,418 | 7/1988 | Yoo et al. | 423/244 |
| 4,790,982 | 12/1988 | Yoo et al. | 423/239 |
| 4,836,993 | 6/1989 | Bertolacini et al. | 423/244 |
| 4,868,150 | 9/1989 | Spooner et al. | 502/303 |
| 4,912,078 | 3/1990 | Krijgsman | 502/341 |
| 4,963,520 | 10/1990 | Yoo et al. | 502/64 |
| 5,002,742 | 3/1991 | Lussier et al. | 423/244.1 |
| 5,007,999 | 4/1991 | Chin | 502/41 |
| 5,288,675 | 2/1994 | Kim | 502/65 |
| 5,399,327 | 3/1995 | Kim | 423/244.11 |

Primary Examiner—E. Rollins Cross
Assistant Examiner—Bekir L. Yildirim
Attorney, Agent, or Firm—Steven Capella

[57] ABSTRACT

A composition comprising a coprecipitated magnesia-lanthana-alumina ($MgO$—$La_2O_3$—$Al_2O_3$) wherein the MgO component is present as microcrystalline phase, having a BET ($N_2$) surface area of at least 130 m$^2$/g, preferably combined with a catalytic oxidation and/or reducing promoter metal such as ceria, vanadia and/or titania.

7 Claims, 2 Drawing Sheets

FIG. 2
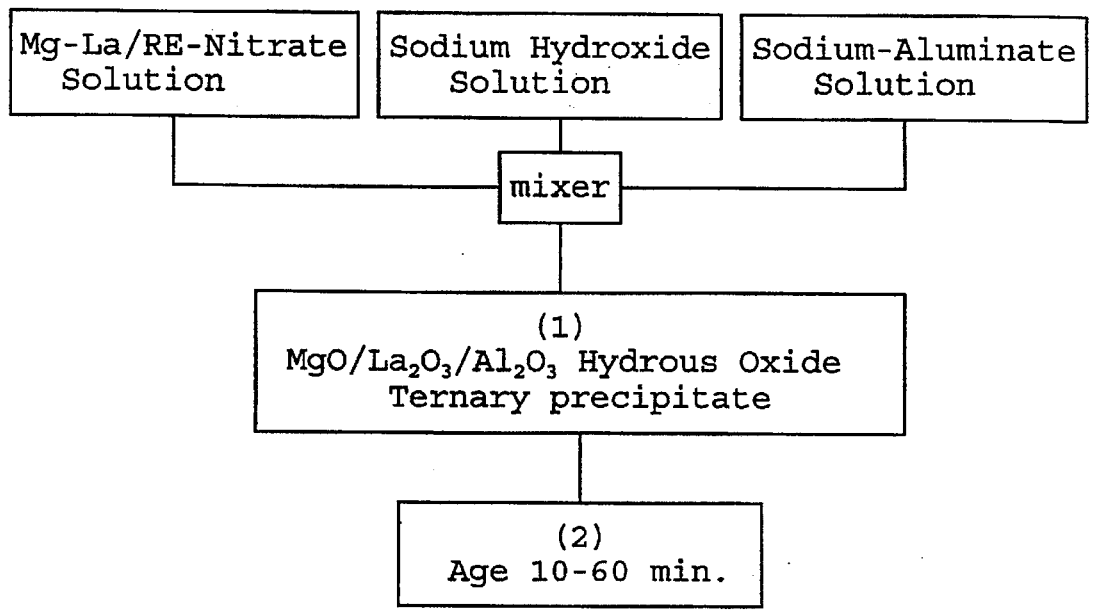
Fig. 2A
Fig. 2B
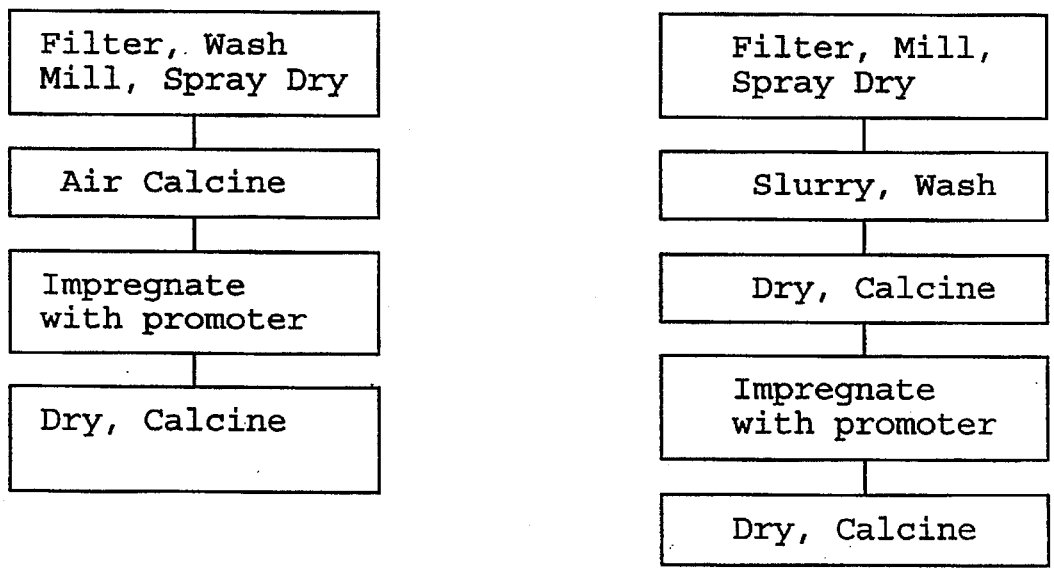

SOX CONTROL COMPOSITIONS

This application is a continuation of U.S. patent application Ser. No. 08/182,468, filed Jan. 18, 1994, now U.S. Pat. No. 5,399,327, which is a divisional of U.S. patent application Ser. No. 07/831,610 filed Feb. 5, 1992. now U.S. Pat. No. 5,288,675.

BACKGROUND OF THE INVENTION

The present invention relates to compositions which are used to control sulfur oxide (SOx) emissions from fluid catalytic cracking (FCC) operations, and more particularly to SOx gettering compositions that are capable of capturing SOx during the oxidative regeneration of FCC catalysts, and releasing sulfur as $H_2S$ in the reducing atmosphere of the catalytic cracking reaction zone.

Compositions which have been used to control SOx emissions typically comprise magnesia, alumina and rare earth oxides.

In particular, U.S. Pat. No. 4,472,267, U.S. Pat. No. 4,495,304 and U.S. Pat. No. 4,495,305 disclose SOx control compositions which contain magnesia-alumina spinel supports in combination with rare-earths such as ceria and lanthana, and U.S. Pat. No. 4,836,993 discloses the preparation of magnesium aluminate ($MgAl_2O_4$) and magnesia-alumina composites that are combined with a rare earth and used as sulfur oxide absorbent in FCC processes.

While prior compositions have been successfully used to control the SOx emissions from FCC units, the industry requires compositions that are efficient for both the pick-up of SOx in the catalyst composition during regeneration, and the release as $H_2S$ in the cracking reaction.

In addition, SOx control agents which are used in the form of separate particulate additives must have hardness and attrition properties that enable the additive to remain in a circulating FCC catalyst inventory.

SUMMARY OF THE INVENTION

It is, therefore, an object of the present invention to provide novel SOx gettering agent compositions.

It is another object to provide SOx control additives for use in FCC processes that are efficient for SOx pick-up and release.

It is a further object to provide magnesia-lanthana-alumina containing SOx control additives that are resistant to attrition and capable of maintaining sufficiently high surface area when used in the highly abrasive and hydrothermal conditions encountered in a commercial FCC process.

It is yet another object to provide efficient/economical methods for preparing SOx control additives on a commercial scale.

These and still further objects will become readily apparent to one skilled-in-the-art from the following detailed description, specific examples, and drawing.

BRIEF DESCRIPTION OF THE DRAWINGS

FIGS. 1 and 2 are block diagrams which illustrate preferred methods of preparing the novel compositions of the present invention.

DETAILED DESCRIPTION OF THE INVENTION

Figure 1:
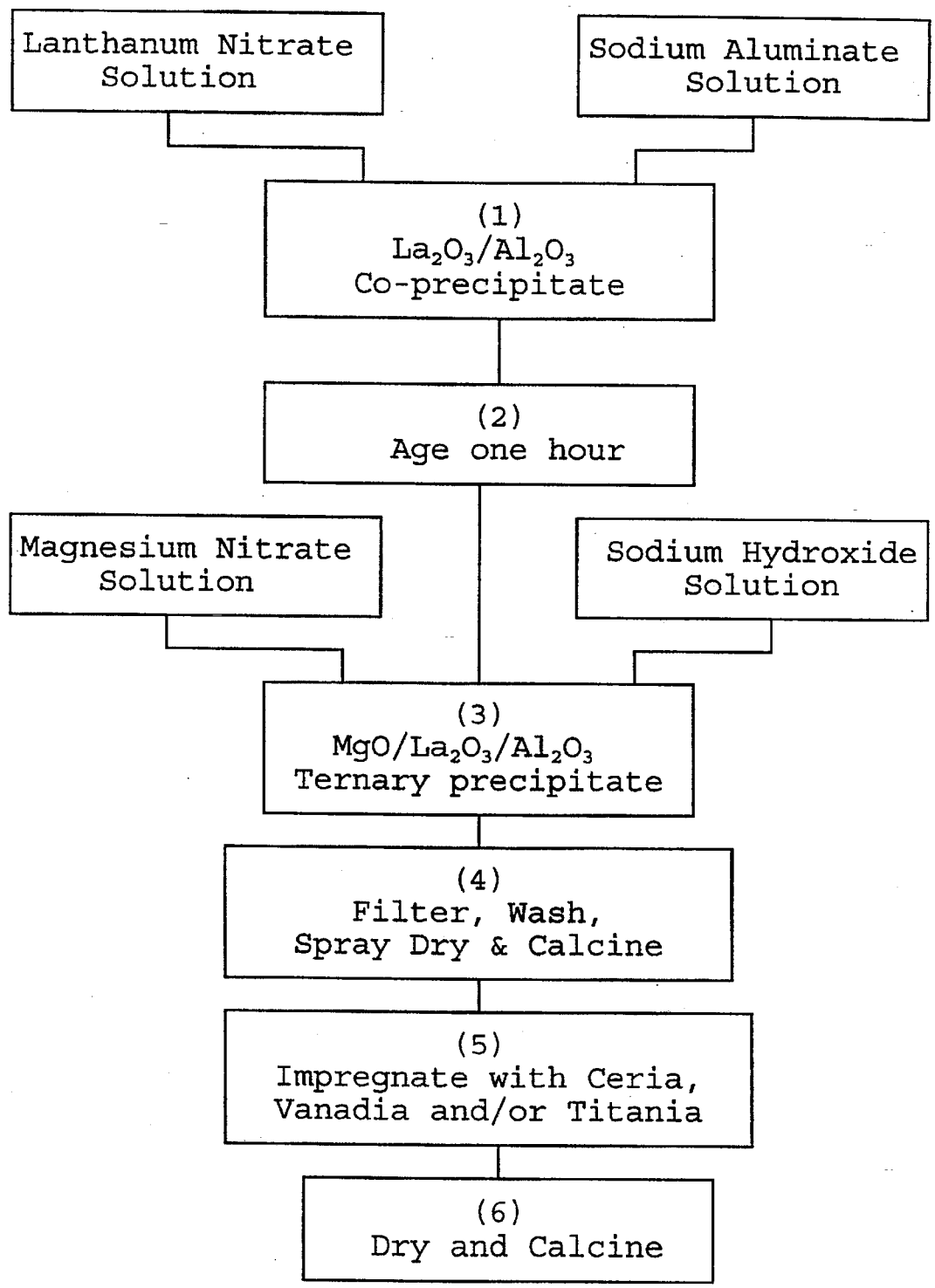

Broadly, my invention contemplates a novel non-spinel, ternary oxide base having the formula (expressed in weight percent calculated as the oxides):

30 to 50 MgO/5 to 30 $La_2O_3$/30 to 50 $Al_2O_3$ wherein the MgO component is present as a microcrystalline phase.

More specifically, my invention comprises a novel MgO/$La_2O_3$/$Al_2O_3$ ternary oxide base in combination with catalytically active amounts of ingredients for promoting $SO_2$ oxidation and/or $SO_3$ reduction (promoter metals), such as ceria and/or vanadia, which is particularly effective for the control of SOx emissions.

The preferred compositions are further characterized by: A fresh surface area of 100 to 300 $m^2$/g following 2-hour air calcination at 538° C., and preferably 130 to 260 $m^2$/g as determined by the B.E.T. method using nitrogen; a surface area of 100 to 200 $m^2$/g upon 48-hour steaming with 20% steam/80% air; a pore volume of 0.4 to 1.0 cc/g as determined by water; an attrition resistance of 0 to 45 Davison Index (DI) as determined by the method disclosed in U.S. Pat. Nos. 3,650,988 and 4,247,420 for fresh material after 2-hour air calcination at 538° C.; a microcrystalline MgO component before and after steaming as determined by X-ray diffraction; a total promoter metal content of 1 to 15%, and preferably 2 to 10% by weight ceria and/or vanadia; and a sodium content of less than about 1% by weight $Na_2O$, and preferably less than 0.5 by weight $Na_2O$.

Referring to FIG. 1, it is seen that the composition may be prepared by a multi-step process described as follows:

(1) A solution containing a lanthanum salt such as lanthanum nitrate is reacted with a solution of sodium aluminate under conditions wherein a separate stream of lanthanum nitrate is combined with a stream of sodium aluminate solution over a period of 20 to 60 minutes in a stirred reaction vessel to form a lanthanum-aluminum hydrous oxide coprecipitate.

(2) The coprecipitated lanthanum-aluminum hydrous oxide slurry mixture of step (1) is aged at a pH of 9.3 to 9.7 for a period of 0.1 to 2 hours at a temperature of 20° to 65° C.

(3) The aged slurry of step (2) is then reacted with an aqueous solution of magnesium nitrate and a solution of sodium hydroxide which are added as separate streams over a period of 20 to 60 minutes to a stirred reaction vessel at a pH of about 9.5 and at a temperature of 20° to 65° C. to obtain a ternary magnesium/lanthanum/aluminum hydrous oxide precipitate.

(4) The ternary oxide precipitate of step (3) is separated by filtration, washed with water to remove extraneous salts, preferably spray dried, and calcined at a temperature of 450° to 732° C. to obtain a ternary oxide base composition that is free of $MgAl_2O_4$ spinel and having a surface area of 130 to 260 $m^2$/g.

(5) The ternary oxide base obtained in step (4) is preferably impregnated with solutions of cerium and/or vanadium and optionally titanium to impart a ceria content of about 5 to 15 weight percent and a vanadia content of about 1 to 10 weight percent and optionally a titania content of 0 to 10 weight percent.

(6) The impregnated base of step (5) is then dried and calcined at a temperature of 450° to 700° C.

Alternative methods for preparing the novel compositions are outlined in FIG. 2 wherein: the lanthanum/rare earth nitrate, sodium hydroxide, sodium aluminate solutions described above are combined in a mixer (typically a four-port mix-pump) to form a Mg-La/RE-Al ternary hydrous oxide coprecipitate which is aged for about 10 to 60 minutes and then further processed into particulate SOx control additives as shown in alternative processing methods (A) and (B).

The preferred compositions of the present invention are prepared in the form of microspheres which have a particle size range of 20 to 200 microns and a Davison attrition index (DI) of 0 to 45, preferably 0 to 15, and are suitable for use as SOx control additive in FCC processes.

The SOx control additive composition may be combined with standard, commercially available zeolite-containing FCC catalyst such as the Octacat, XP, Super-D, and DA grades produced and sold by the Davison Chemical Division of W. R. Grace & Co.-Conn.

It is contemplated that the SOx control additive composition may also be incorporated in FCC catalyst particles during manufacture in a catalyst preparation procedure such as disclosed in U.S. Pat. No. 3,957,689, U.S. Pat. No. 4,499,197, U.S. Pat. No. 4,542,118 and U.S. Pat. No. 4,458,623 and Canadian 967,136.

The SOx control additive compositions are typically added to a FCC catalyst in amounts ranging from 0.2 to 2 weight percent and more preferably 0.5 to 1 weight percent. In one preferred embodiment, the FCC catalyst will also contain a noble metal combustion/oxidation catalyst such as Pt and/or Pd in amounts of 0.1 to 10 ppm. The FCC catalyst/SOx control composition mixture is reacted with hydrocarbon gas-oil and residual feedstocks that contain as much as 2.5 weight percent sulfur (S), at temperatures of 520° to 1100° C. (cracking reaction) and 700° to 750° C. (regeneration). In typical commercial FCC operations it is anticipated that the stack-gas SOx emission may be reduced to a level of about 50 to 100 ppm SOx.

It is also contemplated that the novel compositions of the present invention are useful as supports for hydroprocessing catalysts and as FCC catalyst additives for the passivation of metal such as nickel and/or vanadium.

Having described the basic aspects of my invention, the following examples are included to illustrate specific embodiments.

EXAMPLE 1

Two streams, one with 450 ml of magnesium nitrate solution which was prepared by diluting 411.64 g of Solution A (containing 0.0979 g of MgO in the form of nitrate per gram of solution) with DI-water, the other with 507.63 g of 16 weight percent sodium hydroxide solution, were simultaneously run at approximately the same fractional rate into a stirred tank with approximately 300 ml of DI-water. The resulting slurry had a pH of 12.24. After one-hour aging with agitation at room temperature, the fine precipitate was separated from the supernatant solution by centrifugation. The material was then rinsed twice with high-pH (pH adjusted to 10+ using an ammonium hydroxide solution) DI-water and centrifuged, reslurried, twice rinsed and centrifuged again before oven drying at 115° C. After 2-hour air calcination at 538° C., the material was crushed to obtain below 125 micron particles. The resulting material, hereafter to be referred to as 1A, was found to consist of 97.33% MgO and 2.34% $Na_2O$ by weight. BET ($N_2$) surface area of 1A was 17 $m^2/g$. A 10.12 g (10.00 g on a dry basis) portion of 1A was impregnated to incipient wetness with 3.3 ml of cerous nitrate solution bearing 1.11 g of $CeO_2$. It was dried overnight at 115° C. and then air calcined at 538° C. for one hour. The resulting material is hereafter referred to as 1B.

EXAMPLE 2

Two streams, one with 400 ml of magnesium nitrate solution which was prepared by diluting 306.96 g of Solution A with DI-water, the other with 400 ml of sodium aluminate solution which was prepared by combining 201.06 g of Solution B (bearing 0.1987 g of $Al_2O_3$ per gram of solution) with 60 g of 16 weight percent sodium hydroxide solution, followed by dilution, were run simultaneously at the same rate into a stirred tank with approximately 300 ml of DI-water. The slurry at the end of run-off had a pH of 11.32. After 3-hour aging with agitation, pH of the slurry was lowered to 9.80 using straight nitric acid. The slurry was vacuum filtered. The filtercake was then twice rinsed with 600 ml of DI-water (pH adjusted to 9.5 with ammonium hydroxide), reslurried in one liter of DI water (pH adjusted to 9.5) for 5 minutes, filtered again, twice rinsed again with 600 ml of DI-water (9.5 pH) before oven drying overnight at 115° C. The cake was gently crushed, calcined in flowing air for 2 hours at 677° C., and further crushed to obtain –120 mesh particles. The resulting material, to be hereafter referred to as 2A, had the following composition (weight percent):41.10% MgO, 58.72% $Al_2O_3$, 0.03% $Na_2O$, 0.06% $SO_4$. This material, like the one described in U.S. Pat. No. 4,469,589, exhibited an X-ray diffraction pattern characteristic of magnesium aluminate spinel, and had a BET ($N_2$) surface area of 141 $m^2/g$. A 30.27 g portion of 2A was impregnated to incipient wetness with 14.5 ml of cerous nitrate solution bearing 4.48 g of $CeO_2$, dried overnight at 115° C., and air calcined at 538° C. for one hour. A 15.30 g portion of the resulting material, 2B, was impregnated to incipient wetness with 6 ml of vanadyl oxalate solution bearing 0.385 g of $V_2O_5$, dried overnight at 115° C., and air calcined at 538° C. for one hour. The resulting material is referred to as 2C hereafter.

EXAMPLE 3

In order to prepare a ternary oxide base consisting of MgO—$La_2O_3$—$Al_2O_3$, a staged coprecipitation was carried out as follows: Two streams, one with 400 ml of solution containing 21 g of $La_2O_3$ as nitrate and 70 g of concentrated (70% $HNO_3$) nitric acid, the other with 400 ml of sodium aluminate solution bearing 37.80 g of $Al_2O_3$, were run simultaneously at the same volumetric rate, approximately 80 ml/min., into a stirred beaker with approximately 300 ml of DI-water. The slurry at the end of this run-off showed a pH of 9.12, and then 9.58 upon one-hour aging at room temperature. To this slurry were added again simultaneously another two streams at approximately 80 ml/min., one with 400 ml of solution containing 471.91 g of Solution A, the other 400 ml of solution containing 460 g of 16 wt. % sodium hydroxide solution. The resulting slurry having a pH of 10.40 was vacuum filtered, rinsed twice with 600 ml of high-pH (10–11 using ammonium hydroxide) DI-water, reslurried in 1000 ml of high-pH DI-water, filtered, rinsed twice again with high-pH DI-water, and filtered. The resulting filtercake was dried overnight at 115° C., crushed and sifted to obtain below 180-micron particles. A portion of this material air-calcined at 677° C. for 2 hours, hereafter to be referred to as 3A, had a BET ($N_2$) surface area of 165 $m^2/g$, and had the following composition (weight percent): 42.63% MgO, 19.10% $La_2O_3$, 36.89% $Al_2O_3$, 0.09% $Na_2O$, 0.18% $SO_4$. Unlike the binary base of 2A, 3A showed no $MgAl_2O_4$ spinel pattern when examined by X-ray diffraction. Another portion air-calcined at 732° C. for 2 hours,. hereafter to be referred to as 3B, had a surface area of 140 $m_2/g$. Like 3A, the X-ray diffraction pattern of 3B did not show the presence of $MgAl_2O_4$ spinel.

A 45.21 g (45.00 g on a dry basis) portion of 3A was impregnated to incipient wetness with 43 ml of cerous nitrate solution bearing 6.72 g of $CeO_2$, dried overnight in oven at 115° C., air-calcined at 538° C. for one hour. A 45.78 g (45.00 g on a dry basis) portion of the above-resulting material was once again impregnated to incipient wetness with 21 ml of vanadyl oxalate solution bearing 1.15 g of $V_2O_5$, dried overnight at 115° C., and air-calcined at 538° C. for one hour. The resulting catalyst is hereafter referred to as 3C.

A 30.99 g (30.00 g on a dry basis) portion of 3B was also treated successively with cerous nitrate solution and vanadyl oxalate solution in exactly the same manner as in the preparation of 3C to obtain a catalyst having virtually identical chemical composition to 3C. The resulting catalyst is hereafter referred to as 3D.

EXAMPLE 4

Another ternary oxide base bearing the same three-metal oxides as in Example 3, but in a substantially different ratio, was prepared using the procedure described in Example 3 as follows:

The first stage run-off was carried out using two streams, one with 400 ml of solution containing 12.60 g of $La_2O_3$ as nitrate and 110 g of concentrated nitric acid, the other with 400 ml of sodium aluminate solution bearing 47.27 g of $Al_2O_3$. The slurry had a pH of 8.3 when the run-off was completed, showing gradually increased pH to 8.9 upon one hour aging at room temperature. The second stage run-off involved two streams fed into the above-resulting slurry, one with 450 ml of solution containing 461.18 g of Solution A, the other with 450 ml of solution containing 526 g of 16% sodium hydroxide solution. The resulting slurry having a pH of 11.6 was quickly filtered, and treated in exactly the same manner as in Example 3. A portion of fried and crushed particles of below 180 microns showed a surface area of 221 $m^2/g$ upon 2 hour-677° C. air calcination. This calcined material, hereafter to be referred to as 4A, had the following composition (weight percent): 43.90% MgO, 11.75% $La_2O_3$, 43.59% $Al_2O_3$, 0.09% $Na_2O$, 0.08 $SO_4$. Another portion of dried and crushed particles was air calcined at 732° C. for 2 hours. The resulting material, hereafter to be referred to as 4B, had a surface area of 163 $m^2/g$. X-ray diffraction scan showed that both 4A and 4B had no $MgAl_2O_4$ spinel.

Two ceria-vanadia-promoted catalysts were prepared, one each from 4A and 4B in exactly the same manner as in Example 3 as follows: A 39.14 g (39.00 g on a dry basis) of 4A was impregnated with 29 ml of cerous nitrate solution bearing 5.83 g of $CeO_2$, dried and air calcined. A 40.53 g (40 g on a dry basis) portion of the above-resulting material was then impregnated with 18 ml of vanadyl oxalate solution bearing 1.03 g of $V_2O_5$, dried and calcined. The resulting material is hereafter referred to as 4C. A 35.35 g (35.00 g on a dry basis) portion of 4B was impregnated with 24 ml of cerous nitrate solution bearing 5.23 g of $CeO_2$, dried and calcined. A 35.64 g (35.00 g on a dry basis) portion of the resulting material was impregnated again with 16 ml of vanadyl oxalate solution bearing 0.90 g of $V_2O_5$, dried and calcined. The resulting catalyst, hereafter to be referred to as 4D, is virtually identical to 4C in chemical composition.

EXAMPLE 5

Two streams, one with 300 ml of sodium aluminate solution containing 151.00 g of solution B which was described in Example 2, the other with 300 ml of nitric acid containing 95 g of 70.5 wt. % $HNO_3$, were simultaneously run at the same rate into a stirred beaker containing approximately 200 ml of DI-Water. The resulting pH was 3.86. Upon one-hour aging with agitation, pH rose to 5.36. After the usual vacuum filtration, rinse, reslurry, and rinse with DI-water, the filtercake was dried overnight at 115° C., and air calcined at 677° C. for 2 hours. The resulting material, 5A, showed an X-ray diffraction pattern characteristic of delta alumina.

EXAMPLE 6

For two reasons, (1) the overwhelming factor controlling the efficiency of SOx additive is the capacity of the additive for $SO_3$ capture, and (2) the fact that the deterioration rate of additive efficiency is rather high, the capacity for $SO_3$ capture was determined for the fresh samples only. Each sample was made up of a blend of 9,950 g of steamed (6 hours in fluidized bed at 760° C. and 5 psig) OCTACAT® and 0.050 g of fresh additive, all on a dry basis. Each sample was charged into an Inconel reactor having an I.D. of 1.04 cm, and was subjected to two-stage treatments—(1) a 30-min. reduction in flowing (1500 ml total/min.) $N_2$ containing 2 vol. % $H_2$, and (2) a 30-min. oxidation in flowing (1.5 liter total/min.) $N_2$ containing 4 vol. % $O_2$ and 0.0900 vol. % $SO_2$ at 677° C. or 732° C. After each treatment, the sample was discharged, homogenized, and the sulfate level was determined on a one-gram portion removed from the sample. The weight % $SO_4$ found in each sample—only 0.5 wt. % of the sample is a fresh additive—as a result of the oxidation treatment was taken as a measure of the capacity for $SO_3$ capture.

The results summarized in Table 1 revealed the following: While the $SO_3$ captured by 1B (ceria-promoted MgO) appears to be fairly high, as indicated by the high wt. % $SO_4$, it is apparent that only about 30%—the weight % $SO_4$ found on 1B corresponds to approximately 30% of the theoretical maximum attainable for this material—of magnesia in the additive is effective in capturing $SO_3$. Thus, the data suggest the key to obtain a high capacity is to achieve a high degree of dispersion of MgO or Mg atoms.

While the results of weight % $SO_4$ found on 2A, 2B and 2C are slightly lower than that for 1B primarily because of the lower MgO loading in this additive, 2B and 2C are much better than 1B in terms of effectiveness in contributing to $SO_3$ capture, amounting to approximately 65% of the theoretical maximum.

Of all the samples from Examples 1–5 evaluated by this test, the promoted ternary oxide of this invention, 3C as well as 4C and 4D, show the highest capacity for $SO_3$ capture, amounting to approximately 75% of the theoretical maximum. This is clear evidence for the fact that the non-spinel compositions of Examples 3C, 4C, and 4D can provide a larger number of traps capable of capturing $SO_3$ than the spinel composition of Example 2A, 2B, and 2C. Catalysts prepared by single-stage run-off, e.g., 9A-13A, exhibit further increased capacities for $SO_3$ capture. Thus, these data show that there is no requirement for MgO and $Al_2O_3$ to be in the form of spinel structure in order for MgO to have a high capacity for capturing $SO_3$.

It is also evident from the data on 5A that alumina by itself has negligibly low capacity for $SO_3$ capture.

EXAMPLE 7

A 0.40 g sample of unblended fresh catalyst was placed in a down-flow Vycor glass reactor and was exposed to flowing $N_2$ containing 9.50 vol. % $O_2$ and 0.6000 vol. % $SO_2$ at a total flow rate of 126 ml/min. and 732° C. for a period of 3 hours, and cooled in flowing $N_2$ for discharge.

A 0.10 g portion of the above-treated sample was examined by temperature programmed reduction (TPR)/massspectrometer in a ramp-mode at a rate of 20° C./min., using propane at 14.2 ml/min. as a reducing agent. During the course of this TPR run, the concentration of $H_2S$ was determined as a function of temperature by monitoring mass number 34. The concentration of $SO_2$ released was so low in all runs that the $SO_2$ release data (based on mass number 48 for SO fragment) were simply ignored. The release data summarized in Table II—the lower the temperature for the onset of release or for reaching the peak release, the easier for the captured $SO_3$ to be released as $H_2S$—reveal the following: (1) $SO_3$ captured by crystalline MgO promoted with 10 wt. % $CeO_2$ (1B) cannot be readily released at all.

(2) Without vanadium promotion, the $SO_3$ captured by magnesium aluminate spinel, with ceria promotion alone, appears to be also difficult to reduce. (3) The ternary oxides of this invention, $MgO$—$La_2O_3$—$Al_2O_3$ (e.g., 12A), are just as good as the $Mg_2Al_2O_4$ spinel carrying one excess mole of MgO per mole of $Al_2O_3$ in release capability when they are promoted with ceria and vanadia.

EXAMPLE 8

Binary and ternary oxide bases prepared in Examples 2, 3 and 4 were subjected to 100% steam at 760° C. and 1 atm. for a period of six hours. Catalyst samples of 9A-13A were steamed over a 48-hour period in flowing air (2.8 liters/min.) containing 20 vol. % steam at 704° C. The resulting materials were characterized by BET ($N_2$) surface area as well as by X-ray diffraction. The results presented in Tables I–III reveal—(1) The ternary oxide bases of this invention, $MgO$—$La_2O_3$—$Al_2O_3$, are significantly higher in surface area than the binary oxide base of $MgO$—$Al_2O_3$ under hydrothermal conditions. (2) Spinel structure is not necessarily a requirement for an SOx additive to be effective in making a good SOx transfer catalyst.

EXAMPLE 9

A mixed metal oxide base consisting of MgO, La-rich rare earth oxides, and $Al_2O_3$ was obtained by running a single-stage coprecipitation as follows: Three streams were simultaneously run into 10,000 g of heel water in a kettle at 65° C. with good agitation. Stream No. 1 contained 757.7 g of MgO along with 241.1 g of La-rich rare earth oxide, all in the form of nitrate in a total volume of 9840 ml. Stream No. 2 was made up of sodium aluminate solution containing 723.2 g of $Al_2O_3$ and 1120 g of 50 wt. % sodium hydroxide solution in a total volume of 9840 ml. While these two streams were run at the same rate of 400 ml/min., the feed rate of Stream No. 3 with 16 wt. % sodium hydroxide solution was varied so as to control pH of the slurry at 9.3–9.4. After 10-minute aging the slurry under this condition, pH of the slurry was raised to 9.8, and then the slurry was immediately vacuum filtered. The filtercake was rinsed six times with 15 liters of pH 10 DI-water (pH adjusted with ammonium hydroxide). The resulting filtercake was homogenized, Drais-milled, and then rehomogenized before feeding into a spray dryer. A portion of the spray-dried material was air calcined 2 hours at 677° C.

A small portion of the above-resulting base weighing 75.34 g (74.00 g on a dry basis) was impregnated to incipient wetness with 71.5 ml of cerous nitrate solution bearing 11.06 g of $CeO_2$, dried overnight at 115° C. for one hour. An 83.55 g (82.00 g on a dry basis) portion of the resulting material was impregnated to incipient wetness with 51 ml of vanadyl oxalate solution bearing 2.10 g of $V_2O_5$, dried overnight at 115° C., and air calcined at 538° C. for one hour. The resulting catalyst, hereafter to be referred to as 9A, showed the following data: Chemical composition (weight percent): 37.4% MgO, 10.3% $La_2O_3$, 12.4% $CeO_2$, 24.2% total rare earth oxide, 0.2% $Na_2O$, 2.5% $V_2O_5$, and 35.7% $Al_2O_3$. $SO_3$ pick-up was 0.38 wt. % $SO_4$ when a test was conducted at 732° C. for the $SO_2$ oxidation described in Example 6. A small portion of 9A was examined by X-ray diffraction before and after a 48-hour exposure to flowing air (2.8 liters/minute) containing 20 vol % steam at 704° C. Virtually no $MgAl_2O_4$ spinel phase was present in the material before and after steaming. BET ($N_2$) surface areas ($m^2$/g) before and after steaming were 167 and 114, respectively.

EXAMPLE 10

A single-stage coprecipitation run was carried out in essentially the same manner as in Example 9, except that the two streams were run at 325 ml/min. into heel water at 45°±7° C. A portion of the spray-dried material was air calcined 2 hours at 677° C. A small portion of the resulting material weighing 71.05 g (70.00 g on a dry basis) was impregnated to incipient wetness with 67 ml of solution containing both 10.29 g of $CeO_2$ in the form of cerous nitrate and 2.06 g of $V_2O_5$ in the form of vanadyl oxalate. The material was oven dried overnight at 115° C., and then air calcined at 538° C. for one hour. The resulting catalyst, hereafter to be referred to as 10A, had the following data: Chemical composition (weight percent): 37.4% MgO, 10.1% $La_2O_3$, 12.7% $CeO_2$, 24.2% total rare earth oxide, 0.2% $Na_2O$, 2.5% $V_2O_5$, and 35.8% $Al_2O_3$. $SO_3$ pick-up in a test with $SO_2$ oxidation at 732° C. described in Example 6 was 0.47 wt. % $SO_4$ for this catalyst. Catalyst 10A also showed virtually no spinel before and after 48-hour/704° C. steaming described in Example 8. BET ($N_2$) surface areas ($m^2$/g) before and after steaming were 183 and 114, respectively.

EXAMPLE 11

A single-stage coprecipitation run was carried out in exactly the same manner as in Example 10, except that stream No. 1 had an additional ingredient, i.e., it contained 624.8 g of MgO, 213.5 g of La-rich rare earth oxide, and 130.8 g of $CeO_2$, all in the form of nitrate in a total volume of 9840 ml. Stream No. 2 had 723.7 g of $Al_2O_3$ in the form of sodium aluminate along with 832 g of 50 wt. % sodium hydroxide solution in a total volume of 9840 ml. A portion of the spray-dried material was air calcined 2 hours at 677° C. A small portion of the resulting material weighing 71.32 g (70.00 g on a dry basis) was impregnated to incipient wetness with 40 ml of vanadyl oxalate solution bearing 1.84 g of $V_2O_5$, oven dried overnight at 115° C., and then air calcined at 538° C. for one hour. The resulting catalyst, hereafter to be referred to as 11A, showed the following data: Chemical composition (weight percent): 38.1% MgO, 10.4% $La_2O_3$, 6.9% $CeO_2$, 18.8% total rare earth oxide, 0.2% $Na_2O$, 2.7% $V_2O_5$, and 40.1% $Al_2O_3$. $SO_3$ pick-up in a test with $SO_2$ oxidation at 732° C. described in Example 6 was 0.36 wt. % $SO_4$ for this catalyst. Virtually no spinel was found in 11A before and after the 48-hour/704° C. steaming described in Example 8. BET ($N_2$) surface areas before and after steaming were 142 and 106, respectively.

EXAMPLE 12

Another single-stage coprecipitation run was carried out in a manner somewhat different from Examples 9–11. Three streams were simultaneously run into a high speed mix-pump reactor with four ports, allowing the viscous product to fall into 4000 g of heel water in a kettle maintained at 38°–41° C. with good agitation. Stream No. 1 in this run-off contained 688.8 g of MgO, 223.9 g of La-rich rare earth oxide, and 120.6 g of $CeO_2$, all in the form of nitrate in a total volume of 9840 ml. Stream No. 2 had a sodium aluminate solution bearing 688.8 g of $Al_2O_3$ along with 480 g of 50 weight percent sodium hydroxide solution in a total volume of 9840 ml. While these two streams were fed at the same rate of 400 ml/minute, the feed rate of Stream No. 3 with 16 weight percent sodium hydroxide solution was adjusted so as to control pH of the slurry in the kettle at 9.4–9.5. After aging the slurry under this condition for 15 minutes and confirming pH was at 9.5 at the end of aging, the slurry was immediately vacuum filtered. The filtercake was washed twice with 15 liters of 9.5 pH DI-water (pH adjusted with ammonium hydroxide), and then was vacuum filtered. The resulting filtercake was homogenized in a high-shear mixer, one-pass Drais milled, and then was rehomogenized. Finally, the slurry was spray dried to obtain microspheres. A portion of the spray dried material was air calcined at 677° C. for 2 hours.

A 70.52 g (70.00 g on a dry basis) portion of the above-resulting base was sprayed with 58 ml of an ammoniacal vanadium citrate solution bearing 1.80 g of $V_2O_5$ using an atomizer. After allowing the impregnated material to stand at room temperature for 20 minutes, the material was oven dried overnight at 115° C., and then was air calcined at 538° C. for one hour. The resulting catalyst, hereafter to be referred to as 12A, was virtually spinel-free before and after 48-hour/704° C. steaming (with 20% steam/ 80% air), and showed an attrition resistance of 45 DI. Chemical composition (weight percent) was as follows: 36.1% MgO, 11.0% $La_2O_3$, 6.5% $CeO_2$, 18.8% total rare earth oxide, 0.95% $Na_2O$, 2.6% $V_2O_5$, and 41.4% $Al_2O_3$. BET ($N_2$) surface areas before and after the steaming were 175 and 115 $m^2$/g, respectively. $SO_3$ pick-up for this catalyst was 0.47 weight percent $SO_4$ in the test described in Example 6. Most important of all, this catalyst exhibited an excellent release pattern as indicated by the low onset temperature in Table II for $H_2S$ release in the propane TPR test and a large amount of $H_2S$ release observed.

EXAMPLE 13

Illustrated in this example is a single-stage coprecipitation run identical to Example 12, except for the subsequent washing step. Unlike in Example 12, which corresponds to A route in Figure II, the wash step in this example is included after the unwashed slurry has been spray dried, according to B route. That is, after the identical coprecipitation run-off, followed by aging and filtration, the filtercake was immediately homogenized using a high-shear mixer without washing at all, milled, rehomogenized, and was spray dried.

A 200 g portion of the resulting microspheres was slurried once in 500 g DI-water at room temperature for 3 minutes, and then washed once with 500 g of room temperature DI-water, and filtered. After overnight drying in a 115° C. oven, the material was air calcined at 704° C. for 2 hours. A 70.44 g (70.00 g on a dry basis) portion of the above-calcined material was sprayed with 49 ml of an ammoniacal vanadium citrate solution bearing 1.80 g of $V_2O_5$ in the form of fine mist. After a 20-minute soak at room temperature, the material was oven dried overnight at 115° C., and then was one-hour air calcined at 538° C. The resulting catalyst, hereafter to be referred to as 13A, showed the following data: Chemical composition (weight percent): 37.5% MgO, 10.9% $La_2O_3$, 6.4% $CeO_2$ 18.7% total rare earth oxide, 0.2% $Na_2O$, 2.5% $V_2O_5$, and 40.7% $Al_2O_3$. BET($N_2$) surface areas before and after 48-hour/704° C. steaming (with 20% steam/ 80% air) were 185 and 120 $m_2$/g, respectively. $SO_3$ pick-up in a test with $SO_2$ oxidation at 732° C. described in Example 6 was 0.53 weight percent $SO_4$. This catalyst was also virtually spinel-free before and after the steaming, and was found to be fairly attrition resistant, judging from its fresh DI of 13. As shown in Table II, this catalyst is also expected to be reasonably good in release capability, judging from its test data in the propane TPR test of Example 7.

TABLE I

| Sample | Sample Description | $SO_2$ Oxidation @ °C. | $SO_3$ Pick-up wt. % $SO_4$ |
| --- | --- | --- | --- |
| Steamed OCTACAT ®* | An FCC Catalyst | 677 | 0.00 |
| 1B | $CeO_2$/MgO | 732 | 0.330 |
| 2A | $MgO.MgAl_2O_4$, Spinel | 67 | 0.295 |
| 2B | $CeO_2$/2A | 677 | 0.280 |
| 2C | $V_2O_5$/2B | 677 | 0.279 |
| 3C | $V_2O_5$/$CeO_2$/MgO—$La_2O_3$—$Al_2O_3$ | 732 | 0.34 |
| 4C | $V_2O_5$/$CeO_2$/MgO—$La_2O_3$—$Al_2O_3$ | 732 | 0.34 |
| 4D | $V_2O_5$/$CeO_2$/MgO—$La_2O_3$—$Al_2O_3$ | 732 | 0.33 |
| 5A | $Al_2O_3$ | 732 | 0.007 |
| 9A | $V_2O_5$/$CeO_2$/MgO—$(La/RE)_2O_3$—$Al_2O_3$ | 732 | 0.38 |
| 10A | $V_2O_5$/$CeO_2$/MgO—$(La/RE)_2O_3$—$Al_2O_3$ | 732 | 0.47 |
| 11A | $V_2O_5$/$CeO_2$/MgO—$(La/RE)_2O_3$—$Al_2O_3$ | 732 | 0.36 |
| 12A | $V_2O_5$/MgO—$(La/RE)_2O_3$—$Al_2O_3$ | 732 | 0.47 |

*This steamed FCC catalyst contains virtually no metal oxides that can contribute to $SO_3$ capture.

TABLE II $H_2S$ Release Temperatures (°C.) in Propane - TPR

| Sample | | Onset | Peak | Peak |
| --- | --- | --- | --- | --- |
| 1B | $CeO_2$/MgO | 627 | — | 736 |
| 2B | $CeO_2$/MgO.$MgAl_2O_4$, Spinel | 571 | — | 715 |
| 2C | $V_2O_5$/2B | 476 | 645 | 710 |
| 3C | $V_2O_5$/$CeO_2$/MgO—$La_2O_3$—$Al_2O_3$ | 536 | 650 | 722 |
| 4C | $V_2O_5$/$CeO_2$/MgO—$La_2O_3$—$Al_2O_3$ | 526 | 647 | 712 |
| 4D | $V_2O_5$/$CeO_2$/MgO—$La_2O_3$—$Al_2O_3$ | 497 | 647 | 702 |
| 11A | $V_2O_5$/$CeO_2$/MgO—$(La/RE)_2O_3$—$Al_2O_3$ | 530 | 647 | 715 |
| 12A | $V_2O_5$/MgO—$(La/RE)_2O_3$—$Al_2O_3$ | 475 | 650 | — |

TABLE III

| | | Properties of Steamed SOx Additives on Bases | | |
|---|---|---|---|---|
| | Steaming | BET ($N_2$) Surface Area, $m^2/g$ | | Powder |
| Sample | Condition | Before Steaming | After Steaming | X-Ray Diffraction Pattern |
| 2A | a | 141 | 70 | Well-crystallized $MgAl_2O_4$ spinel and some MgO |
| 3A | a | 165 | 137 | Microcrystalline MgO |
| 4A | a | 221 | 162 | Microcrystalline MgO |
| 9A | b | 167 | 114 | Microcrystalline MgO & $CeO_2$ |
| 10A | b | 183 | 114 | Microcrystalline MgO & $CeO_2$ |
| 11A | b | 142 | 106 | Microcrystalline MgO & $CeO_2$ |
| 12A | b | 175 | 115 | Microcrystalline MgO and microcrystalline $CeO_2$ | a. 6 h/760° C. in 100% steam.
b. 48 h/704° C. in 20% steam/80% air.

I claim:

1. A coprecipitated ternary oxide composition having the formula:

30 to 50 MgO/5 to 30 $RE_2O_3$/30 to 50 $Al_2O_3$ wherein (1) the amounts of MgO, $RE_2O_3$ and $Al_2O_3$ are expressed as weight percent, (2) $RE_2O_3$ is La-rich rare earth oxide, and (3) the MgO is present as a microcrystalline component.

2. The composition of claim 1 further characterized by the absence of a spinel phase, a surface area of 100 $m^2/g$ to 300 $m^2/g$, and a $Na_2O$ content of below about 1% by weight.

3. The composition of claim 2 wherein the surface area is 130 to 200 $m^2/g$.

4. The composition of claim 2 having a surface area of 100 to 150 $m^2/g$ after heating to 704° C. for 48 hours in the presence of 20% steam/80% air.

5. The composition of claim 1 combined with a catalytically active amount of promoters for $SO_2$ oxidation and/or $H_2S$ release selected from the oxides of Ce, Pr, Ti, Nd and V.

6. The composition of claim 5, combined with an FCC catalyst.

7. The composition of claim 6 wherein the FCC catalyst includes an oxidation catalyst selected from the group consisting of Pt, Pd and mixtures thereof.

* * * * *